Figure 1:
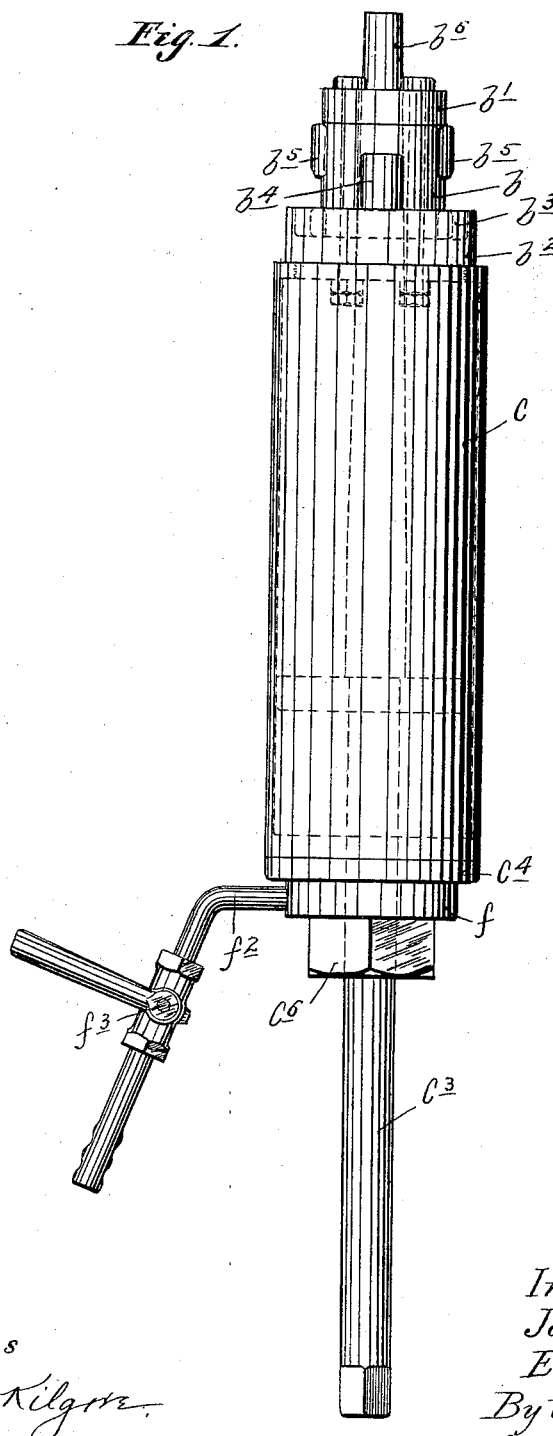

No. 612,838. Patented Oct. 25, 1898.
J. T. FUHRMANN & E. NELSON.
ATTACHMENT FOR FLUE OR TUBE EXPANDERS.
(Application filed Jan. 2, 1897.)

(No Model.) 3 Sheets—Sheet 1.

Witnesses
Harry Kilgore
R. D. Merchant

Inventors
John. T. Fuhrmann,
Erick Nelson,
By their attorney
Jas. F. Williamson

THE NORRIS PETERS CO., PHOTO-LITHO., WASHINGTON, D. C.

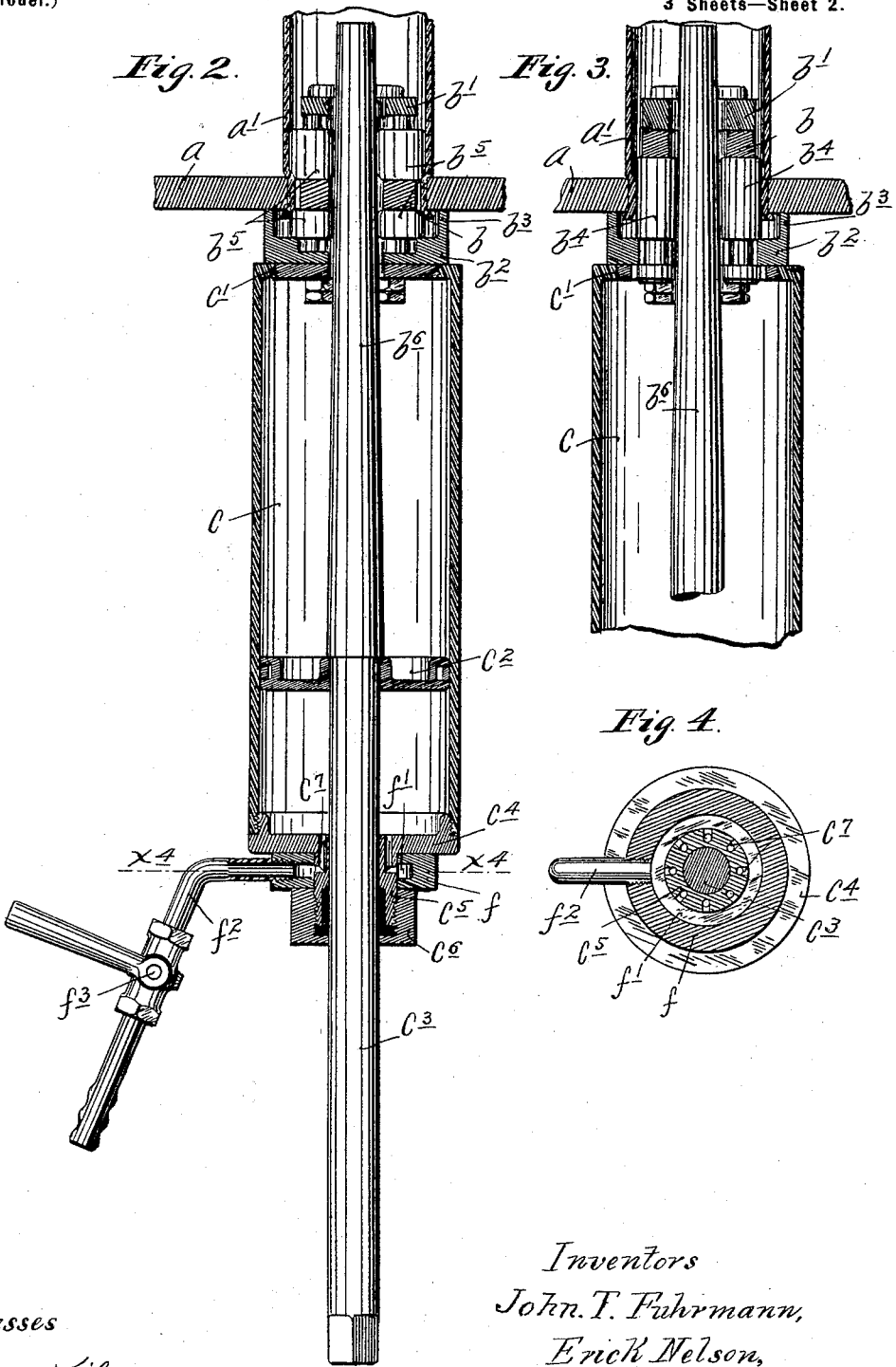

No. 612,838. Patented Oct. 25, 1898.
J. T. FUHRMANN & E. NELSON.
ATTACHMENT FOR FLUE OR TUBE EXPANDERS.
(Application filed Jan. 2, 1897.)
(No Model.) 3 Sheets—Sheet 3.
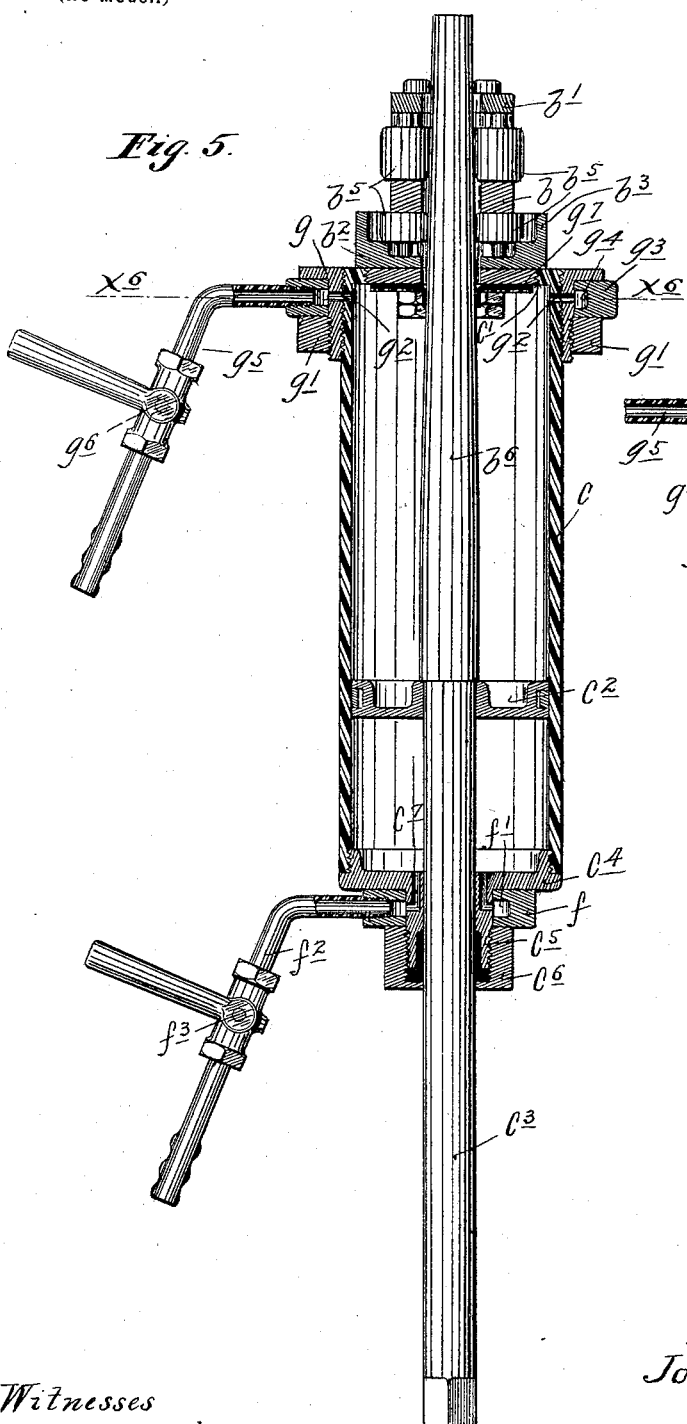
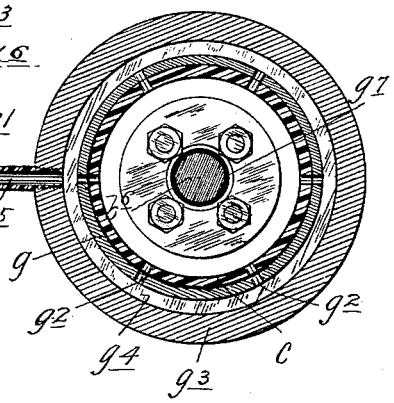
Witnesses
Harry Kilgore
R. D. Merchant
Inventors
John T. Fuhrmann,
Erick Nelson,
By their attorney
Jas. F. Williamson

UNITED STATES PATENT OFFICE.

JOHN T. FUHRMANN AND ERICK NELSON, OF ST. PAUL, MINNESOTA; SAID NELSON ASSIGNOR, BY MESNE ASSIGNMENTS, OF ONE-HALF TO HENRY H. VAUGHAN, OF SAME PLACE.

ATTACHMENT FOR FLUE OR TUBE EXPANDERS.

SPECIFICATION forming part of Letters Patent No. 612,838, dated October 25, 1898.

Application filed January 2, 1897. Serial No. 617,754. (No model.)

*To all whom it may concern:*

Be it known that we, JOHN T. FUHRMANN and ERICK NELSON, citizens of the United States, residing at St. Paul, in the county of Ramsey and State of Minnesota, have invented certain new and useful Improvements in Attachments for Flue or Tube Expanders; and we do hereby declare the following to be a full, clear, and exact description of the invention, such as will enable others skilled in the art to which it appertains to make and use the same.

Our invention has for its object to provide an improved feed device in the nature of a feed-motor for coöperation with a flue-expander and by means of which the expander may be more easily and effectually fed or held to its work.

To these ends our invention consists of the novel devices and combinations of devices hereinafter described, and defined in the claims.

So far as the broad or generic idea of our invention is concerned the form of the flue-expander employed is immaterial, so long as it be of some form which is capable of being fed to its work or expanded by the action of a feed-motor of some design, and the form of the feed-motor, on the other hand, is not limited to any particular construction or class, further than that it must be capable of coöperation with the expander to produce the expanding or feed movement of the same.

For certain obvious reasons and for others hereinafter noted we preferably employ a feed-motor in the form of a straight-line fluid-operated engine involving a cylinder, a piston, and suitable valve mechanism. This form of feed-motor is especially adapted for use in connection with the form of the flue-expander illustrated in Letters Patent of the United States No. 555,915, issued of date March 3, 1896, to Fuhrmann and Daugherty, entitled "Flue-expander."

Several forms of our invention involving fluid-pressure motors or straight-line engines, designed especially for and shown in operative connection with the form of flue-expander referred to above, are illustrated in the accompanying drawings, wherein like letters refer to like parts throughout the several views.

Figure 1 is a view in side elevation showing the preferred form of our feed-motor applied to the Fuhrmann and Daugherty flue-expander referred to above. Fig. 2 is a view, principally in longitudinal central section, through the expander and feed-motor shown in Fig. 1 and also through a portion of a boiler-head and a flue upon which the said expander is positioned to operate. Fig. 3 is a longitudinal central section taken through the parts shown in Fig. 2, the section of the same being taken at a right angle to the plane of the section of said Fig. 2 and some parts being broken away. Fig. 4 is a transverse section taken on the line $X^4$ $X^4$ of Fig. 2. Fig. 5 is a view corresponding substantially to Fig. 2, but illustrating a modified form of the fluid-pressure feed-motor; and Fig. 6 is a transverse section taken on the line $X^6$ $X^6$ of Fig. 5.

$a$ indicates a portion of a boiler-head, and $a'$ a portion of a flue the end or terminal of which is being expanded to form an air-tight joint with the said head $a$ under the action of the expanding device.

For the purposes of this case it is thought to be sufficient to briefly describe the said Fuhrmann and Daugherty expander, as follows:

$b$ indicates a heavy tubular section, which is provided with a removable cap-section $b'$ at its forward end and with a cap $b^2$ at its rear end, which cap $b^2$ is provided with an annular flange $b^3$, which is adapted to bear against the boiler-head $a$ outward of the end or terminal of the flue or tube $a'$. The tubular parts $b$ $b'$ are adapted to be inserted within the flue $a'$, and mounted in suitable radial seats formed in the parts $b$ and $b^2$, with freedom for limited radial expanding and contracting movements, is a pair of expanding-rollers $b^4$, which are located diametrically opposite each other and press against the crown of the joint, and located at substantially ninety degrees to said rollers $b^4$ is a pair of sectioned or two-part rollers $b^5$, the sections of which are spaced apart from each other longitudinally and engage the extremities of the flue-joint to expand or bulge the flue at those points. As before indicated, all of the expanding-rollers $b^4$ and $b^5$ are free for limited radial movements and are adapted to expand and contract in the one case to expand the flue in forming the joint and in the other case to clear the flue for entrance and removal therefrom. To expand the said rollers and at the same time to cause the same to traverse the inside of the flue, a tapered mandrel $b^6$ is employed. As ordinarily used, this mandrel is rotated by means of an oscillating motor or similar device, and the mandrel is forced longitudinally through the expander to expand the same to its work by manual pressure.

In the application of the preferred form of our feed-motor the forward end of the cylinder $c$ of the straight-line engine is rigidly secured to the cap $b^2$ of the expander, as shown, by means of a screw-threaded joint $c'$, and a piston-head $c^2$, which works in said cylinder $c$, is secured on the tapered mandrel $b^6$, which mandrel $b^6$ is in this case provided with an extension or stem $c^3$, which serves as a piston-rod and also as a stem, by means of which the said mandrel $b^6$ may be turned within the expander. The rear end of the said piston-stem $c^3$, as shown, is angular in cross-section to adapt the same for application thereto of the device (not shown) for imparting rotary motion to the said mandrel $b^6$.

The rear end of the cylinder $c$ is closed by means of a cylinder-head $c^4$, which is formed with a hollow trunnion $c^5$, which works on the piston rod or stem portion $c^3$. To the outer end of the trunnion $c^5$ is secured a stuffing-box $c^6$, which is spaced apart from the cylinder-head $c^4$ to form an annular channel, and also serves to form a steam-tight joint between the trunnions $c^5$ and the rod or stem $c^3$. Loosely mounted on the trunnion $c^5$ in the channel formed between the cylinder-head $c^4$ and the stuffing-box $c^6$ is an annular head or ring $f$, formed on its inner surface with an annular channel $f'$. The cylinder-head $c^4$ and trunnion $c^5$ are provided with a series of axial perforations $c^7$, which afford constant communication between the annular channel $f'$ of the ring or head $f$ and the interior of the cylinder $c$. As shown, a short pipe $f^2$, provided with a three-way cock $f^3$, taps the ring or head $f$ and opens into the annular chamber $f'$ thereof. The receiving end of this pipe $f^2$ will in practice be connected to the end of a flexible tube (not shown) which in turn communicates with the source of fluid-supply under pressure.

As is obvious, when the pipe $f^2$ is opened, so as to permit the passage therethrough of the operating fluid from the source of supply, the said fluid will be caused to flow from thence through the annular chamber $f'$ and perforations $c^7$ into the cylinder $c$ back of the piston-head $c^2$, thus causing the said piston-head $c^2$ to move inward or toward the forward end of the cylinder. This movement of the piston-head will of course force the tapered mandrel $b^6$ forward through the expander between the expanding-rollers, thus causing the expanding-rollers to move radially outward into contact with the interior of the flue or boiler-tube. It is exceedingly important to here note that under this action of forcing the tapered mandrel between the expanding-rollers the said expanding-rollers serve as a base of resistance against which the cylinder reacts with an outward or rearward pull which is exactly equal to the forward or inward driving strain applied thereon by the inward movement of the said mandrel. Hence it is evident that the two opposite axial or driving forces on the said rollers will just equalize each other and have no tendency whatever to move the expander axially in either direction. At the same time the said driving forces or strains will not perceptibly interfere with the rotary movements of the mandrel and of the expander. As is evident, when the mandrel is rotated the cylinder will also be rotated, but at only half the rate of speed figured in rotation. When the stop-cock $f^3$ is turned so as to shut off the source of fluid-supply and open the cylinder to exhaust, the said piston-head $c^2$ may be readily drawn rearward and the mandrel from working position simply by taking hold of the stem portion $c^3$ with the hand or otherwise and drawing thereon. The leakage around the joints of the parts will usually be sufficient to permit the withdrawal of the mandrel from the rollers when the air-pressure is cut off; but by the use of the three-way valve $f^3$ the supply of air may be cut off and the cylinder opened to exhaust by one and the same action.

We have found in practice that when air or steam is used as the motive fluid there will be sufficient leakage between the joints of the rotary parts to permit the ready withdrawal of the mandrel from the expander after the source of fluid-supply is shut off, even where an ordinary stop-cock is employed in the pipe-section $f^2$.

In practice we much prefer to use either compressed air or steam as the motive fluid, as these fluids, in virtue of their elasticity, will give a more yielding, quicker, and better application of the expanding force to the expander and a quicker release of the same after the work is done than could be obtained by the use of a non-expansive fluid or liquid, such as water, for example.

In Figs. 5 and 6 the device above described is shown as also provided with the following additional parts: $g$ indicates a flanged collar or ring which is rigidly secured on the exterior of the forward end of the cylinder $c$, as shown, by means of screw-threaded engagement, and provided with an annular nut $g'$, working on the end of the same, but spaced apart from the flange thereof. A series of radial perforations $g^2$ are cut through the cylinder $c$ and collar $g$. $g^3$ indicates a loose annular head which works in the annular chamber formed between the nut $g'$ and the flange of the collar $g$ and is provided on its inner surface with an annular groove $g^4$, which opens to all of the radial perforations $g^2$. In like manner to the annular collar or head $f$ the annular head $g^3$ is tapped by a short pipe-section $g^5$, which opens into the chamber $g^4$ and is provided with an ordinary three-way cock $g^6$. The receiving end of this pipe $g^5$ is also, in like manner to the pipe $f^2$, connected by means of a flexible connection (not shown) with the source of fluid-supply. To prevent the escape of the fluid from the forward end of the cylinder, a flexible packing $g^7$, secured to the forward cylinder-head and engageable with the tapered mandrel $b^6$, is provided.

From the foregoing description it is thought to be obvious that various alterations in the details of construction above specifically set forth may be made within the scope of our invention.

What we claim, and desire to secure by Letters Patent of the United States, is as follows:

1. The combination with a two-part feed-motor, of a tapered mandrel movable axially by one part of said motor, and expanding-rollers working on and revoluble around said mandrel and mounted with respect to the other part of said motor, so that they cannot move axially or circumferentially, but are free to rotate on their own axes and to move radially, whereby rotary motion given to said mandrel will rotate the part of said motor which carries said rollers, and vice versa, substantially as described.

2. The combination with a feed-motor, involving a cylinder and piston, of a tapered mandrel movable axially by said piston, and expanding-rollers working on and revoluble around said mandrel and mounted with respect to said cylinder, so that they cannot move axially or circumferentially, but free to rotate on their own axes and to move radially, whereby rotary motion given to said mandrel, will, through said expanding-rollers, rotate said cylinder, or vice versa, substantially as described.

3. The combination with the feed-motor involving the cylinder and piston, which parts are rotatable one with respect to the other, of a tapered mandrel secured to said piston, a roller-containing head rigidly secured to said cylinder, expanding-rollers working on and revoluble around said mandrel and mounted in said head with freedom for rotary and radial movements, and means for supplying the motive fluid to said cylinder while in motion, substantially as described.

4. The combination with a flue-expander, involving a tapered mandrel, hollow rotary head and expanding-rollers mounted in said head with freedom for rotary and radial movements, of a feed-motor coöperating with said expander, involving a cylinder fixed to and rotatable with said expander-head, a piston-head secured on said mandrel and working in said cylinder, a hollow trunnion formed on the rear cylinder-head, working on the stem of said mandrel and provided with one or more perforations or fluid-passages opening into the cylinder, an annular head or ring swiveled on said hollow trunnion and provided with an annular groove which is constantly open to the passage or passages in said trunnion, and a fluid-supply connection opening into the annular channel of said swiveled head, substantially as described.

5. The combination with a flue-expander, involving a tapered mandrel, hollow rotary head and expanding-rollers mounted in said head with freedom for rotary and axial movements, of a feed-motor coöperating with said expander, involving the cylinder fixed to and rotatable with said expander-head, a piston-head secured on said mandrel and working in said cylinder, a hollow trunnion formed on the rear cylinder-head, working on the stem of said mandrel and provided with one or more perforations or fluid-passages opening into the cylinder, an annular head or ring swiveled on said hollow trunnion and provided with an annular groove which is in constant communication with the passage or passages of said trunnion, one or more perforations or passages opening through the inner or forward end of said cylinder, an annular head or ring swiveled on the inner end of said cylinder and provided with a groove which is in constant communication with the perforation or perforations formed in said cylinder end, fluid-supply pipes leading to the annular grooves of both of said swiveled heads, and a flexible packing secured to the inner or forward cylinder-head and engaging said mandrel, substantially as described.

In testimony whereof we affix our signatures in presence of two witnesses.

JOHN T. FUHRMANN.
ERICK NELSON.

Witnesses:
　JAS. F. WILLIAMSON,
　H. H. VAUGHAN.